（12）United States Patent
Maeguchi et al.

(10) Patent No.: US 9,573,246 B2
(45) Date of Patent: Feb. 21, 2017

(54) METHOD OF PRE-EVALUATING WATER JET PEENING, RECORDING MEDIUM HAVING PROGRAM RECORDED THEREON TO EXECUTE THE METHOD, DEVICE FOR EXECUTING THE METHOD, AND WATER JET PEENING METHOD

(71) Applicant: MITSUBISHI HEAVY INDUSTRIES, LTD., Tokyo (JP)

(72) Inventors: Takaharu Maeguchi, Tokyo (JP); Takahiro Ota, Tokyo (JP); Tomoshige Takata, Tokyo (JP); Hideki Madokoro, Tokyo (JP); Hiroshi Kanasaki, Tokyo (JP); Nobuyuki Hori, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 160 days.

(21) Appl. No.: 14/540,107

(22) Filed: Nov. 13, 2014

(65) Prior Publication Data

US 2015/0151405 A1 Jun. 4, 2015

(30) Foreign Application Priority Data

Nov. 29, 2013 (JP) ................................ 2013-247967

(51) Int. Cl.
 *B24C 1/10* (2006.01)
 *G06F 17/50* (2006.01)
 (Continued)

(52) U.S. Cl.
 CPC . *B24C 1/10* (2013.01); *C21D 7/06* (2013.01); *G06F 17/5009* (2013.01);
 (Continued)

(58) Field of Classification Search
 CPC .... B24C 1/10; G06F 17/5009; G06F 17/5018; G06F 2217/16; C21D 7/06; B23P 9/04; B21D 31/06; B21D 26/02
 (Continued)

(56) References Cited

U.S. PATENT DOCUMENTS

2011/0232348 A1 9/2011 Hatou et al.

FOREIGN PATENT DOCUMENTS

| JP | 5011416 B2 | 8/2012 |
|----|------------|--------|
| WO | 2013/125463 A2 | 8/2013 |

OTHER PUBLICATIONS

Zwart et al., "A Two-Phase Flow Model for Predicting Cavitation Dynamics", ICMF 2004 International Conference on Multiphase Flow, May 30-Jun. 3, 2014, Paper No. 152, 11 pages, cited in the specification.

(Continued)

*Primary Examiner* — Peter DungBa Vo
*Assistant Examiner* — Joshua D Anderson
(74) *Attorney, Agent, or Firm* — Westerman, Hattori, Daniels & Adrian, LLP

(57) ABSTRACT

A condition setting process of determining peening conditions for water jet peening on a peening target object, an analysis process of analyzing a jet when a liquid is jetted from a nozzle model to a peening target object model and obtaining a void rate that is a volume rate of air bubbles contained in a unit volume of the liquid and a collapse rate that is a volume of the air bubbles collapsing in a unit time in the unit volume of the liquid in each position on a surface of the peening target object model, a shock pressure correlation value calculation process of obtaining a shock pressure correlation value that is a product of the void rate and the collapse rate in each position, and a range calculation process of obtaining an effective processing range in which (Continued)

the shock pressure correlation value on the surface of the peening target object model is greater than a predetermined value, based on the shock pressure correlation value in each position.

9 Claims, 9 Drawing Sheets

(51) Int. Cl.
  *C21D 7/06* (2006.01)
  *C21D 11/00* (2006.01)
(52) U.S. Cl.
  CPC .......... *G06F 17/5018* (2013.01); *C21D 11/00* (2013.01); *G06F 2217/16* (2013.01)
(58) Field of Classification Search
  USPC .......... 72/53–56; 703/9; 29/90.7; 451/38–40
  See application file for complete search history.

(56) References Cited

OTHER PUBLICATIONS

Zwart et al., "A Two-Phase Flow Model for Predicting Cavitation Dynamics", ICMF 2004 International Conference on Multiphase Flow, May 30-Jun. 3, 2004, Paper No. 152, cited in the specification.
Zhang et al., "Numerical and Experimental Studies of Cavitation Behavior in Water-Jet Cavitation Peening Processing", Shock and Vibration, Nov. 14, 2013, pp. 895-905, XP055187734, cited in Extended European Search Report dated Jun. 5, 2015 (6 pages).
Extended European Search Report dated Jun. 5, 2015, issued in counterpart European Patent Application No. 14193467.9 (4 pages).

METHOD OF PRE-EVALUATING WATER JET PEENING, RECORDING MEDIUM HAVING PROGRAM RECORDED THEREON TO EXECUTE THE METHOD, DEVICE FOR EXECUTING THE METHOD, AND WATER JET PEENING METHOD

BACKGROUND OF THE INVENTION

Technical Field

The present invention relates to a method of pre-evaluating water jet peening, a recording medium having a program recorded thereon to execute this method, a device for executing the method, and a water jet peening method.

Priority is claimed on Japanese Patent Application No. 2013-247967, filed Nov. 29, 2013, the content of which is incorporated herein by reference.

Background Art

In order to suppress stress corrosion cracking of a structure, water jet peening (hereinafter referred to as WJP) may be performed on this structure. This WJP is a technology in which high pressure water is jetted from a nozzle to a surface of the structure, shock waves generated when fine air bubbles generated in this high pressure water collapse are applied to the surface of the structure, an area including the surface is plastically deformed due to the shock waves, and residual tensile stress generated on the surface is converted into residual compressive stress.

In many cases, a part on which WJP is performed is submerged. Therefore, residual stress in the peened part cannot be measured after performing WJP. Therefore, a method of predicting the residual stress of the peened part is disclosed in Patent Document 1 below. In this method, a jet jetted from a nozzle is analyzed to estimate collapse pressure of air bubbles on a peened surface based on a prediction result of internal air bubble pressure of the air bubbles and density of the air bubbles, and residual stress of the peened surface is predicted using this collapse pressure.

CITATION LIST

Patent Literature

[Patent Document 1] Japanese Patent No. 5011416

SUMMARY OF INVENTION

Problem to be Solved by the Invention

As described above, the part that is peened through WJP is submerged, and the residual stress in the peened part cannot be measured after WJP in many cases. Therefore, when a wide part of an object is peened, the nozzle is scanned so that jets jetted from the nozzle sufficiently overlap. Thus, efficiency of the WJP cannot be said to be high in the related art. Further, when the peened object has a complex shape, it is necessary to determine the peening conditions using a real model or a specification of a peening apparatus, and the determination of the peening conditions or the like requires time and efforts.

The present invention provides a technology capable of the quickly determining peening conditions or a specification of a peening apparatus to increase efficiency of WJP.

Means for Solving the Problem

According to a first aspect of the invention, a WJP pre-evaluation method includes: a condition setting process of determining the peening conditions for water jet peening on a peening target object; an analysis process of analyzing a jet when a liquid is jetted from a nozzle model to a peening target object model according to the peening conditions, and obtaining a void rate that is a volume rate of air bubbles contained in a unit volume of the liquid and a collapse rate that is a volume of the air bubbles collapsing in a unit time in the unit volume of the liquid, in each position on a surface of the peening target object model; a shock pressure correlation value calculation process of obtaining a shock pressure correlation value that is a product of the void rate and the collapse rate in each position; and a range calculation process of obtaining an effective processing range in which the shock pressure correlation value on the surface of the peening target object model is greater than a predetermined value, based on the shock pressure correlation value in each position.

The product of the void rate of the air bubbles and the collapse rate of the air bubbles has been empirically shown to be proportional to shock pressure when the air bubbles collapse. Therefore, the product of the void rate of the air bubbles and the collapse rate of the air bubbles can be treated as a shock pressure correlation value. In the pre-evaluation method described above, the effective processing range in which the shock pressure correlation value on the surface of the peening target object model is greater than the predetermined value is obtained based on the shock pressure correlation value in each position on the surface of the peening target object model. Since this effective processing range is a range in which the shock pressure correlation value is greater than the predetermined value, the effective processing range becomes a range in which effective WJP processing is performed. Thus, in the pre-evaluation method described above, since it is possible to estimate the range in which effective processing is performed on the surface of the peening target object, it is possible to increase efficiency of the WJP by determining the peening conditions for WJP according to this estimated range.

According to a second aspect of the present invention, in the WJP pre-evaluation method according to the first aspect of the present invention, the predetermined value may be 0.

According to a third aspect of the present invention, the WJP pre-evaluation method according to any one of the first and second aspects of the present invention may further include a determination process of determining whether the effective processing range obtained in the range calculation process is an appropriate range in a relationship with a target processing range. When it is determined in the determination process that the effective processing range obtained in the range calculation process is not the appropriate range in the relationship with the target processing range, the peening conditions determined in the condition setting process may be changed and then the shock pressure correlation value calculation process and the range calculation process may be executed again.

In the pre-evaluation method according to the third aspect of the present invention, since the peening conditions for WJP are repetitively set according to a determination result of the determination process, it is possible to set more appropriate peening conditions for WJP.

According to a fourth aspect of the present invention, in the WJP pre-evaluation method in which the determination process is executed, the condition setting process may include a nozzle model setting process of identifying a shape of the nozzle model. When it is determined in the determination process that the effective processing range obtained in the range calculation process is not the appropriate range in the relationship with the target processing range, the shape of the nozzle model identified in the nozzle model setting process may be changed and then the shock pressure correlation value calculation process and the range calculation process may be executed again.

In the pre-evaluation method described above, it is possible to set an appropriate shape of the nozzle.

According to a fifth aspect of the present invention, in the WJP pre-evaluation method according to any one of the first to fourth aspects of the present invention, an output process of outputting the effective processing range obtained in the range calculation process may be executed.

According to a sixth aspect of the present invention, the WJP pre-evaluation method includes executing any one of the WJP pre-evaluation methods in which the determination process is executed; and executing WJP for the peening target object under the peening conditions determined in the condition setting process when it is determined in the determination process that the effective processing range obtained in the range calculation process is the appropriate range in the relationship with the target processing range.

According to a seventh aspect of the present invention, a WJP pre-evaluation program included in a recording medium causes a computer to execute a condition reception process of receiving the peening conditions for water jet peening on a peening target object; an analysis process of analyzing a jet when a liquid is jetted from a nozzle model to a peening target object model according to the peening conditions, and obtaining a void rate that is a volume rate of air bubbles contained in a unit volume of the liquid and a collapse rate that is a volume of the air bubbles collapsing in a unit time in the unit volume of the liquid, in each position on a surface of the peening target object model; a shock pressure correlation value calculation process of obtaining a shock pressure correlation value that is a product of the void rate and the collapse rate in each position; and a range calculation process of obtaining an effective processing range in which the shock pressure correlation value on the surface of the peening target object model is greater than a predetermined value, based on the shock pressure correlation value in each position.

According to an eighth aspect of the present invention, in the WJP pre-evaluation program, the predetermined value may be 0.

According to a ninth aspect of the present invention, the WJP pre-evaluation program included in the recording medium according to any one of the seventh and eighth aspects of the present invention may cause the computer to execute a target range reception process of receiving a target processing range on a surface of the peening target object model; and a determination process of determining whether the effective processing range obtained in the range calculation process is an appropriate range in a relationship with the target processing range, and may cause the computer to execute the condition reception process again and then cause the computer to execute the shock pressure correlation value calculation process and the range calculation process again when it is determined in the determination process that the effective processing range obtained in the range calculation process is not the appropriate range in the relationship with the target processing range.

According to a tenth aspect of the present invention, in the WJP pre-evaluation program causing the computer to execute the determination process, the condition setting process may include a nozzle model setting process of identifying a shape of the nozzle model. The program may cause the computer to execute the nozzle model setting process again and then cause the computer to execute the shock pressure correlation value calculation process and the range calculation process again when it is determined in the determination process that the effective processing range obtained in the range calculation process is not the appropriate range in the relationship with the target processing range.

According to an eleventh aspect of the present invention, any one of the WJP pre-evaluation programs may cause the computer to execute an output process of causing the effective processing range obtained in the range calculation process to be output from an output device of the computer.

According to a twelfth aspect of the present invention, a WJP pre-evaluation device includes the computer; and any one of the WJP pre-evaluation programs installed in the computer.

Advantageous Effects of Invention

According to the method of pre-evaluating water jet peening, the recording medium having a program recorded thereon to execute this method, the device for executing this method, and the water jet peening method described above, since the range in which the effective process is performed on the surface of the peening target object can be estimated, it is possible to quickly determine the peening conditions for WJP according to this estimated range without depending on a test. As a result, it is possible to increase efficiency of the WJP.

DESCRIPTION OF EMBODIMENTS

Hereinafter, an embodiments and a modified example thereof according to the present invention will be described in detail with reference to the drawings.

Embodiment

An embodiment of the present invention will be described with reference to FIGS. 1 to 9.

Figure 1:
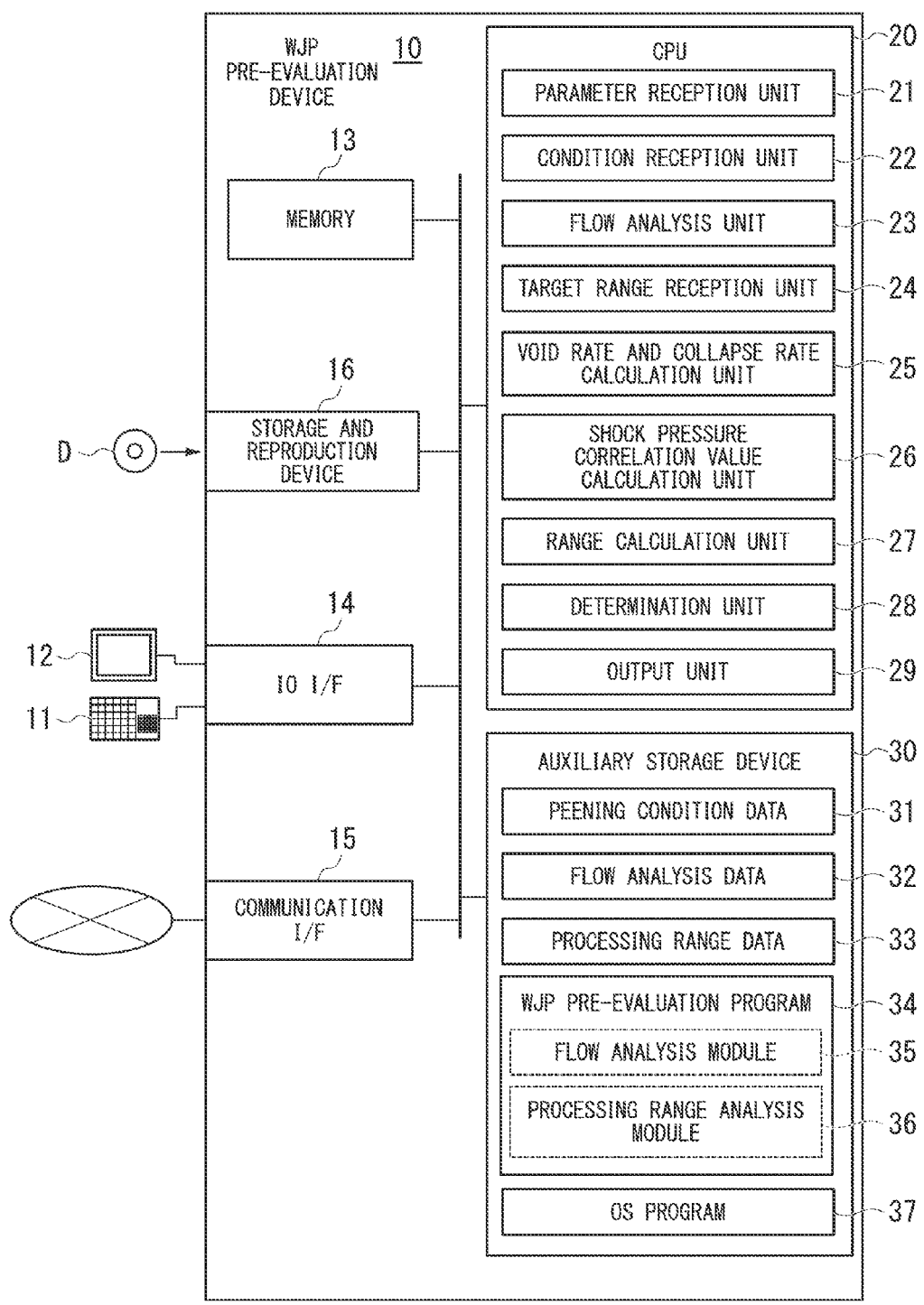
FIG. 1 is an illustrative diagram illustrating a configuration of a WJP pre-evaluation device in an embodiment according to the present invention.

A water jet peening (WJP) pre-evaluation device 10 of this embodiment is a device that evaluates a WJP result in advance before WJP is performed on a peening target object. This WJP pre-evaluation device 10 is a computer, and includes a CPU 20 that performs various operations, a memory 13 including, for example, a work area of the CPU 20, an auxiliary storage device 30 such as a hard disk drive device, an input device 11 such as a keyboard or a mouse, a display unit (output device) 12, an input and output interface 14 for the input device 11 and the display unit 12, a communication interface 15 for communication with the outside over a network, and a storage and reproduction device 16 that performs a data storage process or a data reproduction process on a disk type storage medium D, as illustrated in FIG. 1.

A WJP pre-evaluation program 34 for evaluating a result of WJP on a peening target object in advance, and an OS (Operating System) program 37 are stored in the auxiliary storage device 30 in advance. In other words, the WJP pre-evaluation device 10 of this embodiment is obtained by installing the WJP pre-evaluation program 34 in a computer. The WJP pre-evaluation program 34 includes a flow analysis module 35 that analyzes a jet generated in WJP, and a processing range analysis module 36 that obtains a WJP processing range based on an analysis result of this flow analysis module 35. These programs 34 and 37, for example, are loaded from a disk type storage medium D to the auxiliary storage device 30 via the storage and reproduction device 16. In addition, the programs 34 and 37 may be loaded from an outside device to the auxiliary storage device 30 via the communication interface 15.

Various pieces of data are also stored in the auxiliary storage device 30 in a process of executing the WJP pre-evaluation program 34. Specifically, the peening condition data 31 for WJP, flow analysis data 32 that is an analysis result of the jet generated in the WJP, and the WJP processing range data 33 are stored.

The CPU 20 functionally includes a parameter reception unit 21 that receives various parameters necessary for the analysis of the jet by the flow analysis module 35, a condition reception unit 22 that receives the peening conditions for WJP, a flow analysis unit 23 that analyzes the jet generated in the WJP, a target range reception unit 24 that receives a target processing range for the peening target object, a void rate and a collapse rate calculation unit 25 that obtains a void rate and a collapse rate of the air bubbles generated in the jet, a shock pressure correlation value calculation unit 26 that obtains a correlation value of shock pressure predicted to be applied to the surface of the peening target object, a range calculation unit 27 that obtains an effective processing range predicted to be a range in which the effective processing is performed on the surface of the peening target object, a determination unit 28 that determines whether the effective processing range is an appropriate range for the target processing range, and an output unit 29 that causes the display unit 12 to display the effective processing range.

In addition, the void rate, the collapse rate, the shock pressure correlation value, and the effective processing range will be described in detail below.

Each of the functional units of the CPU 20 functions when the CPU 20 executes the WJP pre-evaluation program 34 stored in the auxiliary storage device 30. More specifically, the parameter reception unit 21, the condition reception unit 22, and the flow analysis unit 23 function through the execution of the flow analysis module 35 of the WJP pre-evaluation program 34. In addition, the target range reception unit 24, the void rate and the collapse rate calculation unit 25, the shock pressure correlation value calculation unit 26, the range calculation unit 27, the determination unit 28, and the output unit 29 function through execution of the processing range analysis module 36 of the WJP pre-evaluation program 34.

Next, a procedure of executing the WJP pre-evaluation method in this embodiment will be described according to the flowchart illustrated in FIG. 2. In addition, in order to simplify the description, it is assumed hereinafter that the surface of the peening target object is a plane and water jets from the nozzle to one point on the surface.

First, the evaluator operates the input device 11 of the WJP pre-evaluation device 10 to set various parameters of the flow analysis module 35. In other words, the parameter reception unit 21 of the WJP pre-evaluation device 10 that is a computer receives various parameters of the flow analysis module 35 (S1: a process of setting parameters of the program (parameter reception process)).

The flow analysis module 35 of this embodiment adopts an LES (Large Eddy Simulation) model for performing numerical analysis on turbulence, a two-phase flow model for performing numerical analysis on behavior of water and a large number of air bubbles present in the water, and a cavitation model for performing numerical analysis on behavior of the air bubbles, including, for example, generation or disappearance of the air bubbles. In this parameter setting process (S1), for example, an evaporation coefficient, a condensation coefficient, an air bubble nucleation part volume rate, and an air bubble diameter are set. In addition, in the parameter setting process (S1), atmospheric pressure (a depth of the water of a part to be peened), density and viscosity of the water, and saturated vapor pressure are set to the same values as those at the time of WJP. Further, in the parameter setting process (S1), density of the vapor is set on the assumption that the vapor is, for example, ideal air.

When the parameter reception unit 21 of the WJP pre-evaluation device 10 receives these parameters, the parameter reception unit 21 sets each parameter in a corresponding place of the flow analysis module 35 developed on the memory 13.

Next, the evaluator operates the input device 11 of the WJP pre-evaluation device 10 and sets the peening conditions for WJP in the WJP pre-evaluation device 10. In other words, the condition reception unit 22 of the WJP pre-evaluation device 10 which is a computer receives the peening conditions for WJP (S2: condition setting process (condition reception process)). This condition setting process (S2) includes a model setting process (a process of receiving numerical data of the model) (S3), and a WJP performance condition setting process (WJP performance condition reception process) (S4).

In the model setting process (S3), the condition reception unit 22 receives a coordinate system of a space in which the peening target object model 45 (see FIG. 3) that is a model of the peening target object 40 is located, numerical data for determining the peening target object model 45, and numerical data for determining the nozzle model 55 (see FIG. 3) that is a model of the nozzle 50 that jets water to the peening target object 40, and stores these in the auxiliary storage device 30 as a part of the peening condition data 31.

However, here, since the surface of the peening target object 40 is a plane, and the water jets from the nozzle 50 to one point of this plane as described above, specific numerical data is not particularly set except that the surface of the peening target object model 45 is the plane in the model setting process (S3).

Figure 4:
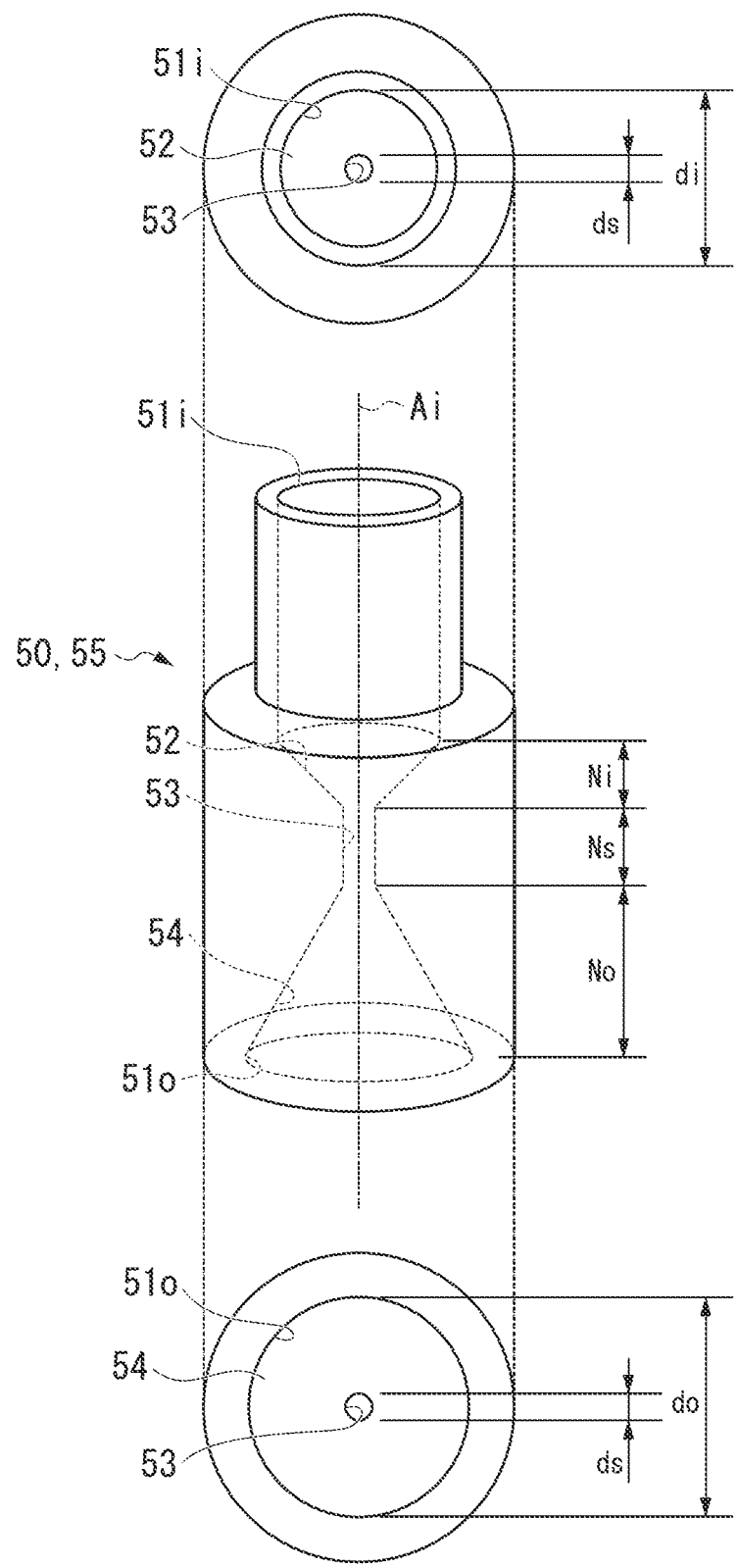
FIG. 4 is an illustrative diagram illustrating a shape of the nozzle in an embodiment according to the present invention.

In the nozzle 50 that jets the water, for example, a flow path is formed along a jet axis Ai penetrating from one end face of a cylindrical member to the other end face thereof, as illustrated in FIG. 4. An opening of the flow path in one end face of the nozzle 50 constitutes an inlet 51i. An opening of the flow path in the other end face of the nozzle 50 constitutes an outlet 51o. In this flow path, there is a reduced diameter portion 52 in which a diameter of the flow path is gradually reduced toward the outlet 51o, a small diameter portion 53 in which the flow path diameter reduced in the reduced diameter portion 52 is maintained, and an enlarged diameter portion 54 in which the flow path diameter gradually increases from the small diameter portion 53 to the outlet 51o. The nozzle model 55 is a model having the same shape as the nozzle 50 described above.

In the model setting process (S3), for example, an inlet flow path diameter di of the nozzle 50, a flow path diameter ds of the small diameter portion 53, an outlet flow path diameter do, a length Ni of the reduced diameter portion 52 in a jet axial direction, a length Ns of the small diameter portion 53 in the same direction, and a length No of the enlarged diameter portion 54 in the same direction are set. In addition, while the shape described above is used as the shape of the nozzle 50 in this embodiment, other shapes may be used.

Figure 3:
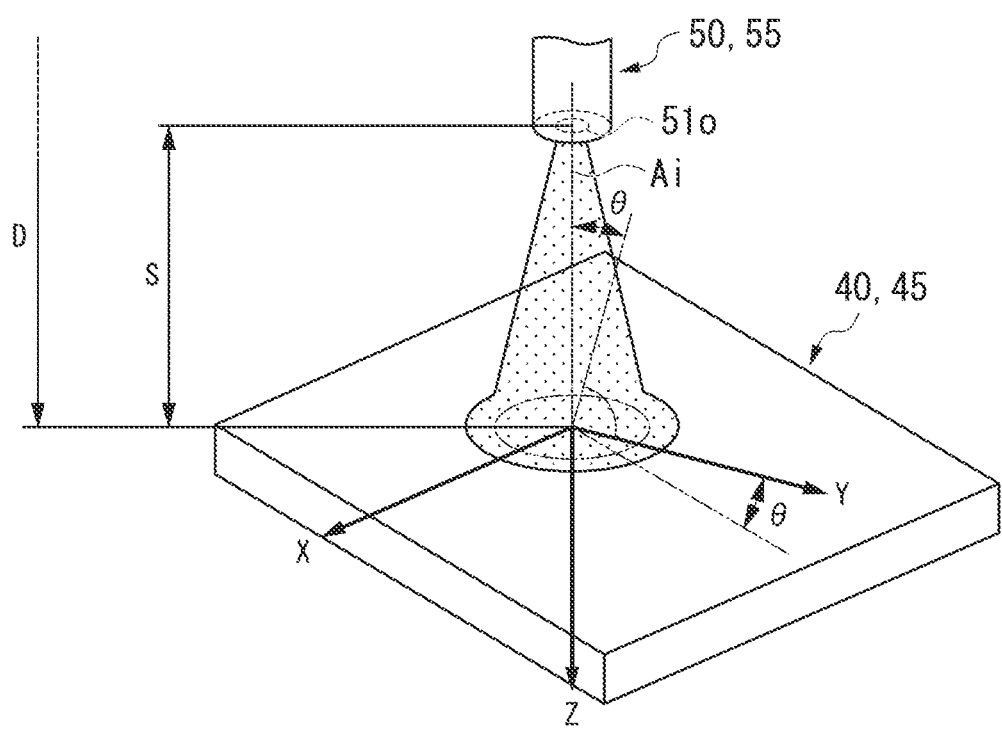
FIG. 3 is an illustrative diagram illustrating a relationship between a nozzle or a nozzle model and a peening target object or a peening target object model in an embodiment according to the present invention.

The above-described coordinate system set in the model setting process (S3), for example, is an XYZ coordinate system in which a point at which the jet axis Ai of the nozzle model 55 and the surface of the peening target object model 45 intersect is an origin, a direction in which the jet axis Ai extends from the origin is a Z axis, an axis perpendicular to this Z axis is an X axis, and an axis perpendicular to the Z axis and the X axis is a Y axis, as illustrated in FIG. 3. In addition, in the XYZ coordinate system, a position of the outlet 51o on the jet axis Ai in an initial position of the nozzle model 55 may be used as the origin.

In the WJP performance condition setting process (S4), the condition reception unit 22 receives, for example, discharge pressure of the jet from the nozzle 50, a flow amount of the jet from the nozzle 50, a jet distance (a distance from the outlet 51o of the nozzle 50 to the surface of the peening target object 40) S of the jet (see FIG. 3), an angle θ of a normal of the surface of the peening target object 40 with respect to the jet axis Ai of the nozzle 50, a water depth D of the surface of the peening target object, a temperature of the water, and a jet time of the water from the nozzle 50 as WJP performance conditions, and stores these in the auxiliary storage device 30 as a part of the peening condition data 31.

Figure 7:
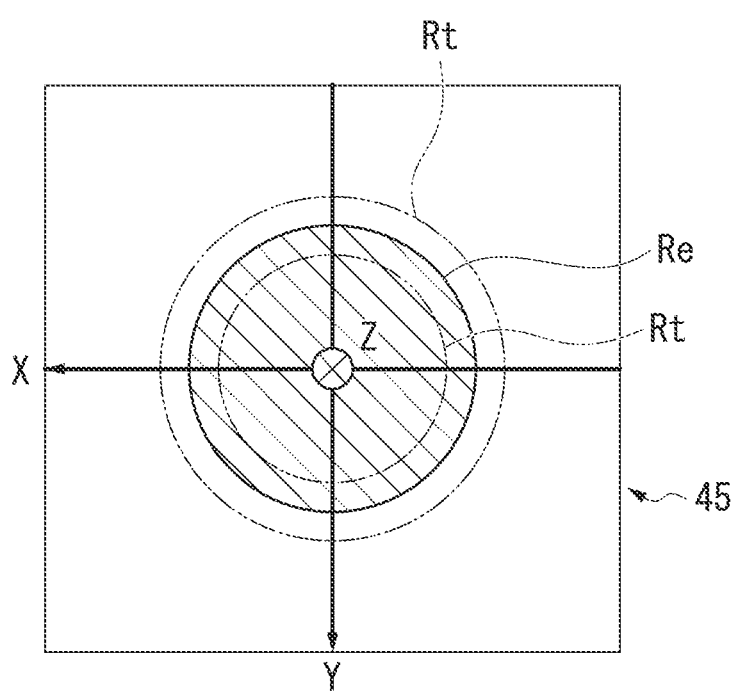
FIG. 7 is an illustrative diagram illustrating a relationship between the effective processing range and a target processing range in an embodiment according to the present invention.

When the condition setting process (S2) is completed, the evaluator operates the input device 11 of the WJP pre-evaluation device 10 to set a target processing range in WJP on the surface of the peening target object model 45 (S5: a process of setting the target processing range (a process of receiving the target processing range)). Here, the target processing range is, for example, a range in which residual stress is desired to be 0 or less on the surface of the peening target object for which WJP is executed. In addition, positive residual stress indicates that the residual stress is residual tensile stress and negative residual stress indicates that the residual stress is residual compressive stress. If the surface of the peening target object 40 is a plane and a normal from one point of this plane and the jet axis Ai of the nozzle 50 overlap (the jet axis Ai of the nozzle 50 is perpendicular to the plane) as described above, the target processing range Rt is a circular area around the origin of the coordinate system that is one point of the surface of the peening target object 40, as illustrated in FIGS. 3 and 7.

When the process (S5) of setting the target processing range Rt is completed, the analysis of the jet under the conditions set in the condition setting process (S2) is executed by the WJP pre-evaluation device 10 (S6: analysis process). This analysis process (S6) includes a flow analysis process (S7), and a process (S8) of calculating a void rate and a collapse rate.

In the flow analysis process (S7), the flow analysis unit 23 analyzes the jet under the conditions set in the condition setting process (S2) to obtain the number of air bubbles that are generated and the number of air bubbles that disappear each time on the surface of the peening target object model 45, and stores a result of this analysis in the auxiliary storage device 30 as the flow analysis data 32.

In this flow analysis process (S7), the number of air bubbles that are generated and the number of air bubbles that disappear each time on the surface of the peening target object model 45 are obtained as follows.

Unsteady LES (Large Eddy Simulation) analysis is performed under the conditions set in the condition setting process (S2) using the two-phase flow model and the cavitation model set in the parameter setting process (S1). The analysis is performed for a period of time until the sufficient statistical information is obtained. This analysis, for example, is capable of being performed using a calculation function such as analysis code FLUENT of ANSYS, Inc. In addition, for the cavitation model, for example, a model described in Philip J. Zwart, Andrew G. Gerber, and Thabet Belamri's "A Two-Phase Flow Model for Predicting Cavitation Dynamics" ICMF 2004 International Conference on Multiphase Flow, Yokohama, Japan, May 30-Jun. 3, 2004 Paper No. 152 can be used.

When the flow analysis process (S7) is completed, the void rate and the collapse rate calculation unit 25 calculates the void rate and the collapse rate for the air bubbles in each position on the surface of the peening target object model 45 (S8: a process of calculating the void rate and the collapse rate). Here, the void rate is a volume rate of air bubbles contained in a unit volume of the water, and the collapse rate is a volume of air bubbles collapsing in a unit time in the unit volume of the water. The void rate and collapse rate calculation unit 25 obtains a volume rate in each unit time of the air bubbles in a period of jet time in the unit volume of the water in each position on the surface of the peening target object model 45 using the flow analysis data 32 stored in the auxiliary storage device 30. Also, the void rate and the collapse rate calculation unit 25 sets an average value of the volume rate in each unit time as the void rate. In addition, the void rate and the collapse rate calculation unit 25 obtains a volume of the air bubbles collapsing in a unit time including the corresponding time in the unit volume of the water in each position on the surface of the peening target object model 45 from the number of air bubbles that disappear each time in the unit volume of the water in each position on the surface of the peening target object model 45 using the flow analysis data 32 stored in the auxiliary storage device 30. Also, the void rate and collapse rate calculation unit 25 sets an average value of the volume of the air bubbles collapsing each unit time as the collapse rate.

When the analysis process (S6) is completed, the shock pressure correlation value calculation unit 26 calculates a shock pressure correlation value in each position on the surface of the peening target object model 45 (S9: shock pressure correlation value calculation process).

It has been empirically shown that the shock pressure P can be expressed as a product of the collapse rate $\eta$ of the air bubbles, the void rate f of the air bubbles, and a coefficient k dependent on the water depth and the flow amount of the jet, as shown in an equation below.

$$P = k \times \eta \times f$$

Therefore, in this embodiment, a product of the collapse rate $\eta$ of the air bubbles and the void rate f of the air bubbles is adopted as the shock pressure correlation value Pc. Thus, the shock pressure correlation value calculation unit 26 multiplies the void rate in the corresponding position on the surface of the peening target object model 45 and the collapse rate in the position to obtain the shock pressure correlation value Pc in the position.

When the shock pressure correlation value Pc in each position on the surface of the peening target object model 45 is calculated, the range calculation unit 27 obtains an effective processing range in which the shock pressure correlation value Pc becomes greater than a predetermined value on the surface of the peening target object model 45 (S10: a process of calculating the effective processing range). Here, the range in which the shock pressure correlation value Pc is greater than 0 is the effective processing range.

Here, the relationships between the shock pressure correlation value (=void rate×collapse rate) Pc in each position on the surface of the peening target object (peening target object model 45), the shock pressure obtained through experiment, and the residual stress obtained through the experiment will be described using FIG. 5.

Figure 5:
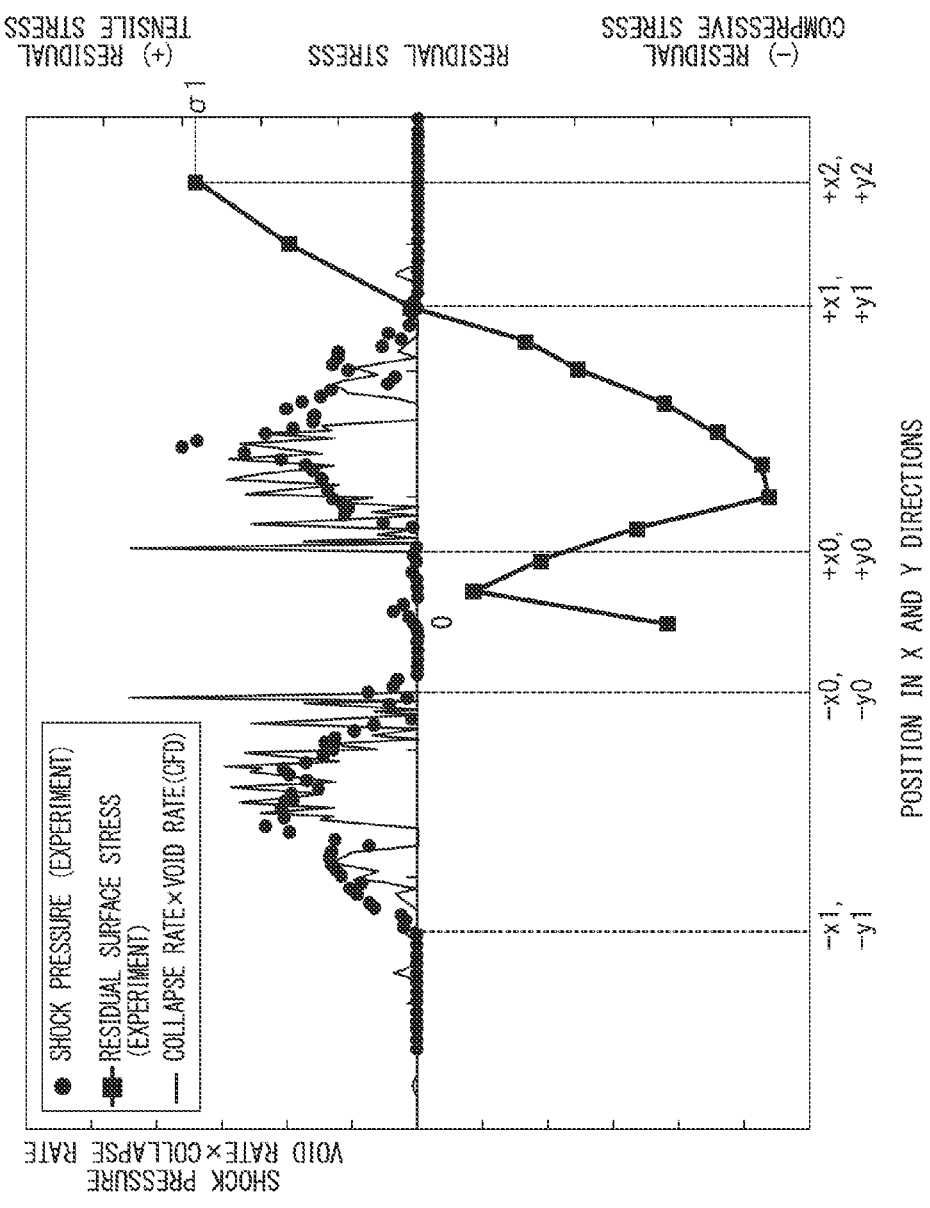
FIG. 5 is a graph illustrating a relationship among a shock pressure correlation value, shock pressure obtained through an experiment, and residual stress obtained through the experiment when a surface of a peening target object (peening target object model) is a plane and a normal from one point of this plane and a jet axis of a nozzle (nozzle model) overlap in an embodiment according to the present invention.

When the surface of the peening target object 40 (the peening target object model 45) is a plane and the normal from one point of this plane and the jet axis Ai of the nozzle 50 overlap, the shock pressure correlation value (=void rate×collapse rate) Pc becomes greater than 0 in a range from a point on the jet axis Ai, that is, the origin of the XYZ coordinate system to the position of ±x1 in the X-axis direction on the surface of the peening target object 40, and a range from the origin to the position of ±y1 in the Y-axis direction, as illustrated in FIG. 5. Therefore, in this case, the above range around the origin becomes the effective processing range.

Figure 6:
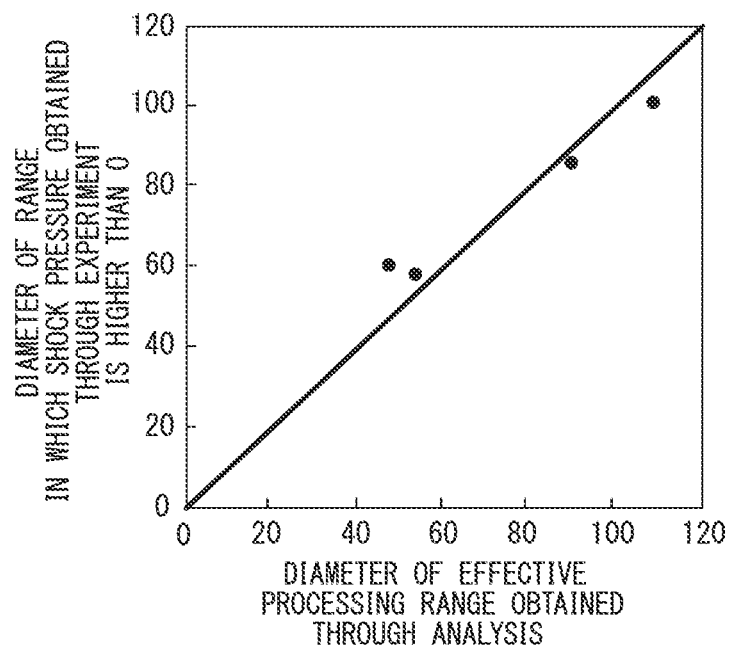
FIG. 6 is a graph illustrating a relationship between a diameter of an effective processing range obtained through analysis and a diameter of an area in which shock pressure obtained through the experiment is greater than 0 in an embodiment according to the present invention.

Here, a relationship between the effective processing range in which the shock pressure correlation value (=void rate×collapse rate) Pc is greater than 0 and the range in which the shock pressure obtained through the experiment is greater than 0 will be described using FIG. 6.

As illustrated in FIG. 3, when the surface of the peening target object 40 is a plane, the angle $\theta$ of the normal of the surface of the peening target object 40 with respect to the jet axis Ai of the nozzle 50 is 0°, and the water jets from the nozzle 50 to one point of intersection of the surface of the peening target object 40 and the jet axis Ai of the nozzle 50, both the effective processing range and the range in which the shock pressure is greater than 0 are the circular areas around the point of intersection of the surface of the peening target object 40 and the jet axis Ai of the nozzle 50. In this case, a diameter of the effective processing range and a diameter of the range in which the shock pressure obtained through the experiment is greater than 0 substantially match, as illustrated in FIG. 6. Thus, there is no problem even when the effective processing range in which the shock pressure correlation value (=void rate×collapse rate) Pc is greater than 0 is treated as the range in which the shock pressure is greater than 0. In addition, this peening target object 40 is processed in advance so that the residual stress on the surface before WJP becomes residual tensile stress $\sigma 1$ over the entire surface.

In this effective processing range, the shock pressure obtained through the experiment becomes greater than 0, and the residual stress has a value of 0 or a negative value, that is, the residual stress becomes 0 or residual compressive stress, as illustrated in FIG. 5. On the other hand, the shock pressure obtained through experiment is substantially 0 and the residual stress has a positive value, that is, the residual stress is the residual tensile stress in a range farther than a position of ±x1 in the X-axis direction from the origin of the XYZ coordinate system and a range farther than a position of ±y1 in the Y-axis direction from the origin. However, the residual stress decreases in comparison with the residual stress $\sigma 1$ before WJP in a range near the position of ±x1 and a range near ±y1 in the Y-axis direction even in the range farther than the position of ±x1 in the X-axis direction from the origin and the range farther than the position of ±y1 in the Y-axis direction from the origin. This is because there is influence of a residual stress field due to plastic deformation of the surface even in an area in which the shock pressure is not actually generated. In addition, the residual compressive stress is obtained for the above reason even in a range closer than a position of ±x0 in the X-axis direction from the origin and a range closer than a position of ±y0 in the Y-axis direction from the origin, which are ranges in which the shock pressure is substantially 0. The residual tensile stress gradually increases as the position is away from the origin, and the residual stress has the same value $\sigma 1$ as that before WJP performance in a position of ±x2 in the X-axis direction from the origin of the XYZ coordinate system and a position of ±y2 in the Y-axis direction from the origin.

As described above, when the range in which the shock pressure correlation value (=void rate×collapse rate) Pc is greater than 0 is the effective processing range, the residual stress becomes 0 or residual compressive stress within this range. In addition, a relationship that the effective processing range in which the shock pressure correlation value (=void rate×collapse rate) Pc is greater than 0 matches the range in which the residual stress becomes 0 or residual compressive stress does not change even when the shape of the peening target object or the peening conditions change. In addition, the effective processing range may be a range in which the shock pressure correlation value (=void rate×collapse rate) Pc is greater than a positive value greater than 0. In this case, the residual stress becomes only residual compressive stress in this effective processing range.

As described above, when the effective processing range is obtained, the output unit 29, for example, causes the display unit to display a screen in which the effective processing range Re and the target processing range Rt are drawn on the surface of the peening target object model 45, as illustrated in FIG. 7 (S11: output process).

When the effective processing range Re and the target processing range Rt are displayed on the display unit, the determination unit 28 determines whether the effective processing range Re is an appropriate range for the target processing range Rt, and specifically, whether the effective processing range Re includes the entire target processing range Rt (S12; determination process).

When it is determined by the determination unit 28 that the effective processing range Re does not include the entire target processing range Rt and is not the appropriate range, the WJP pre-evaluation device 10 returns to the condition setting process (S2). The evaluator operates the input device 11 of the WJP pre-evaluation device 10 while viewing display content of the display unit, to set the peening conditions for WJP in the WJP pre-evaluation device 10 again.

In this condition setting process (S2), the WJP performance conditions are basically changed in the WJP performance condition setting process (S4). However, in the condition setting process (S2), the shape data of the nozzle model 55 may be changed in the model setting process (S3), as necessary.

When the condition setting process (S2) is completed, the process of steps 5 to 12 is executed, as described above. In addition, the target processing range Rt may not be set again in the process (S5) of setting the target processing range Rt.

WJP pre-evaluation ends when the determination unit 28 determines that the effective processing range Re is an appropriate range for the target processing range Rt. The evaluator then peens for the peening target object 40 through WJP under the peening conditions for WJP when it is determined that the effective processing range Re is appropriate.

As described above, in this embodiment, it is possible to estimate the range in which the effective processing is performed on the surface of the peening target object 40 before WJP is performed on the peening target object 40. Therefore, in this embodiment, it is possible to increase efficiency of the WJP by determining the peening conditions for WJP according to such an estimated range.

Incidentally, the above-described embodiment is an example in which water jets from the nozzle 50 to one point of the surface of the peening target object 40. However, in practice, the nozzle 50 is often scanned along the surface of the peening target object 40 to perform WJP over a wide area on the surface. Therefore, hereinafter, an example in which the nozzle 50 is scanned along the surface of the peening target object 40 will be simply described.

Figure 2:
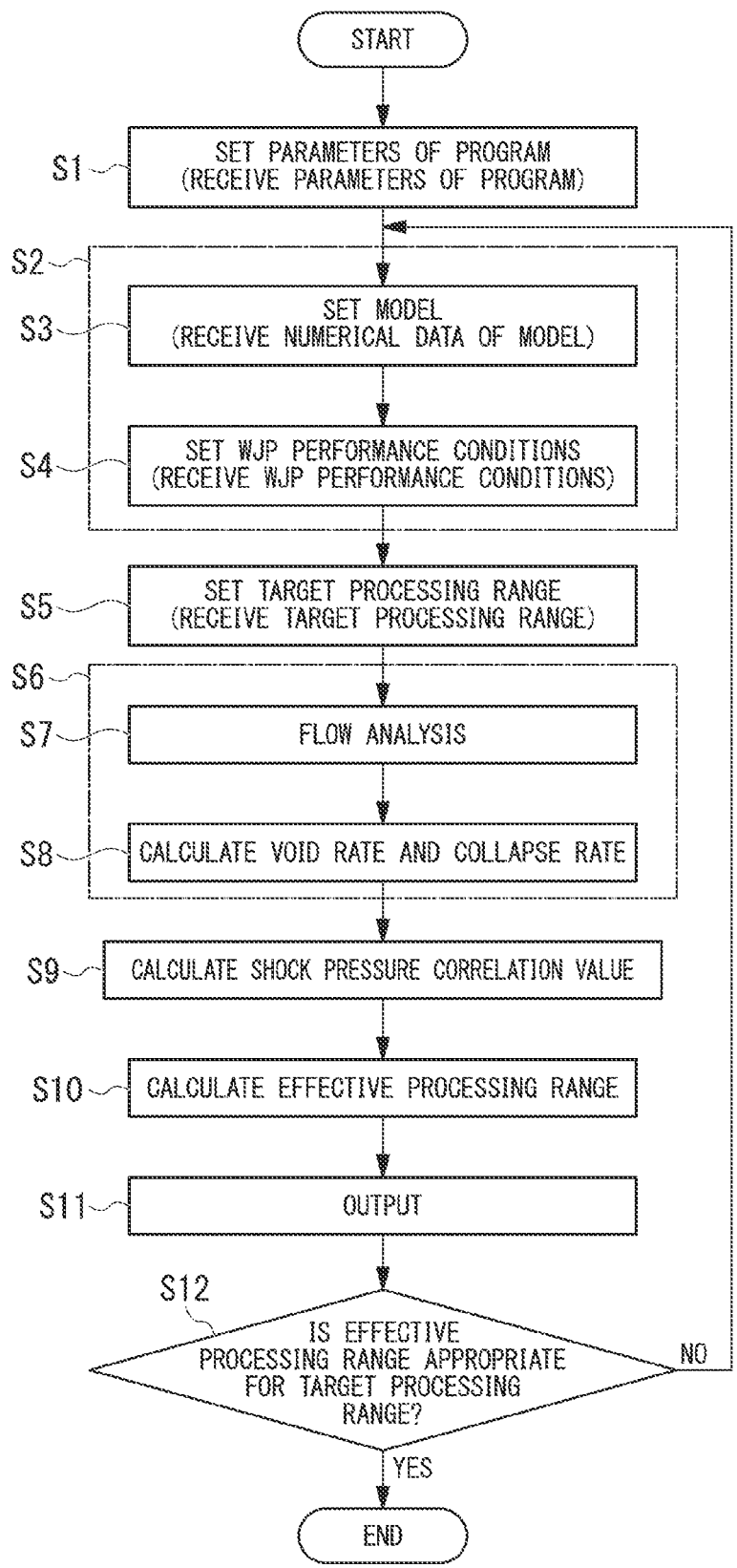
FIG. 2 is a flowchart illustrating a procedure of a WJP pre-evaluation method in an embodiment according to the present invention.

Even when the nozzle 50 is scanned along the surface of the peening target object 40, the WJP pre-evaluation is executed in the same procedure as the procedure illustrated in FIG. 2. However, content of processing in the condition setting process (S2), the target processing range setting process (S5), and the determination process (S12) is slightly different from that in the above-described embodiment.

Figure 8:
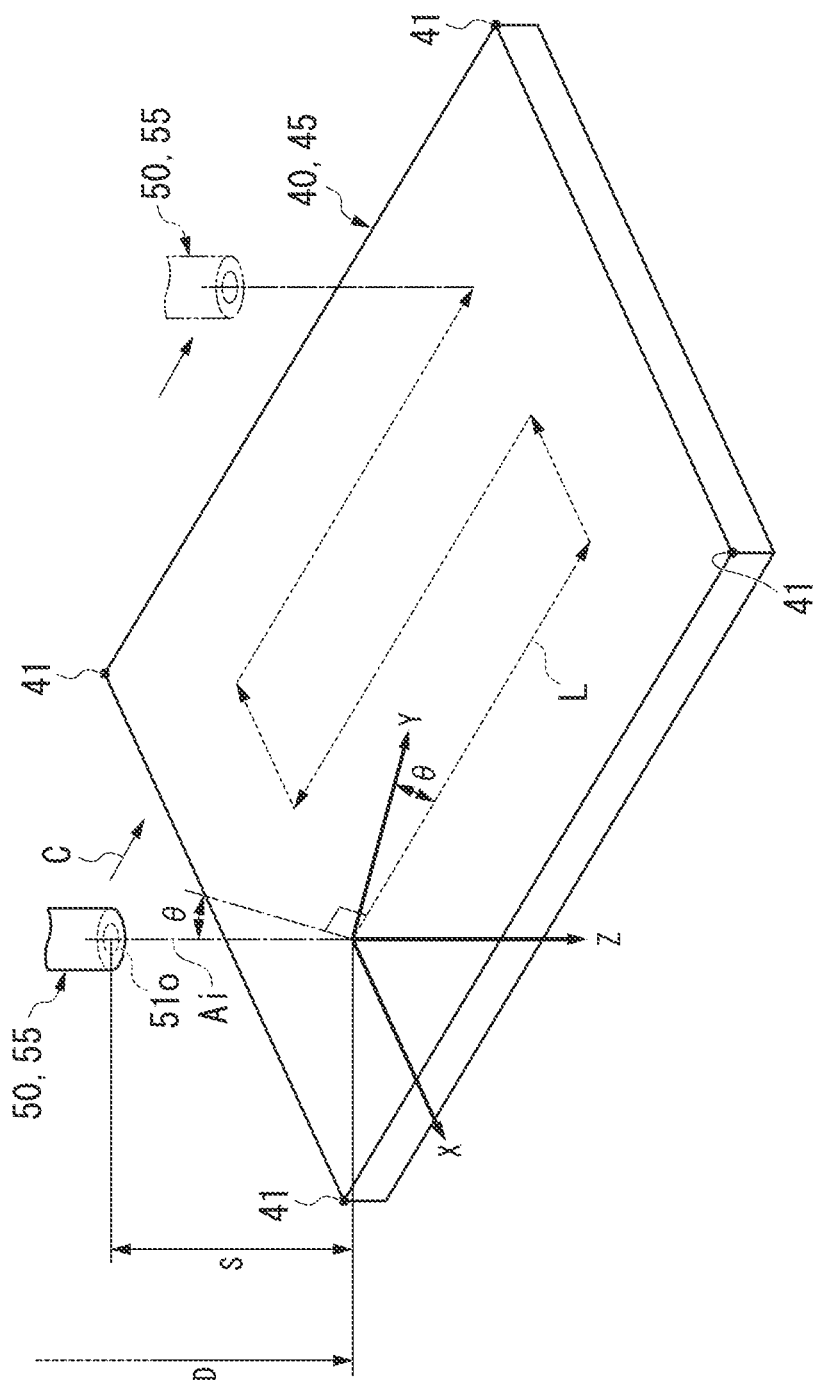
FIG. 8 is an illustrative diagram illustrating a relationship between the nozzle or the nozzle model and the peening target object or the peening target object model when the nozzle is scanned in an embodiment according to the present invention.

In the model setting process (S3) of the condition setting process (S2), the condition reception unit 22 receives numerical data for determining the shape of the peening target object model 45 and stores the numerical data in the auxiliary storage device 30 as a part of the peening condition data 31. Even when the surface of the peening target object model 45 is a plane, a position coordinate of an outer frame of this plane is set here to determine the outer frame. For example, when a shape of the outer frame of the plane is a rectangle, a position coordinate of each corner 41 of the rectangle is set in the XYZ coordinate system, as illustrated in FIG. 8. In addition, even in this case, in the XYZ coordinate system, a point at which the jet axis Ai of the nozzle model 55 in the initial position and the surface of the peening target object model 45 intersect is an origin, and this jet axis Ai is a Z axis. However, a position of the outlet 51o on the jet axis Ai in the initial position of the nozzle model 55 may be the origin, as described above.

In the WJP performance condition setting process (S4) of the condition setting process (S2), the condition reception unit 22 receives, as the WJP performance conditions, discharge pressure of the jet from the nozzle 50, a flow amount of the jet from the nozzle 50, a jet distance (a distance from the outlet 51o of the nozzle 50 to the surface of the peening target object 40) S of the jet, an angle θ of a normal of the surface of the peening target object 40 with respect to the jet axis Ai of the nozzle 50, a water depth D of the surface of the peening target object, and a temperature of the water, and stores these in the auxiliary storage device 30 as a part of the peening condition data 31, as in the above-described case. Further, the condition reception unit 22 receives a movement path C of the nozzle 50 in the XYZ coordinate system described above and movement speed of the nozzle 50, and also stores these in the auxiliary storage device 30 as a part of the peening condition data 31. In addition, when the movement path C of the nozzle 50 is determined, a jet distance S of the jet is necessarily determined, and thus this jet distance S may not be separately set. In addition, when the angle θ of the normal of the surface of the peening target object 40 with respect to the jet axis Ai of the nozzle 50 changes according to the position of the nozzle 50, the angle may be set for each position of the nozzle 50. In addition, for example, the water depth of the origin of the XYZ coordinate system is set as a water depth D of the surface of the peening target object 40.

Figure 9:
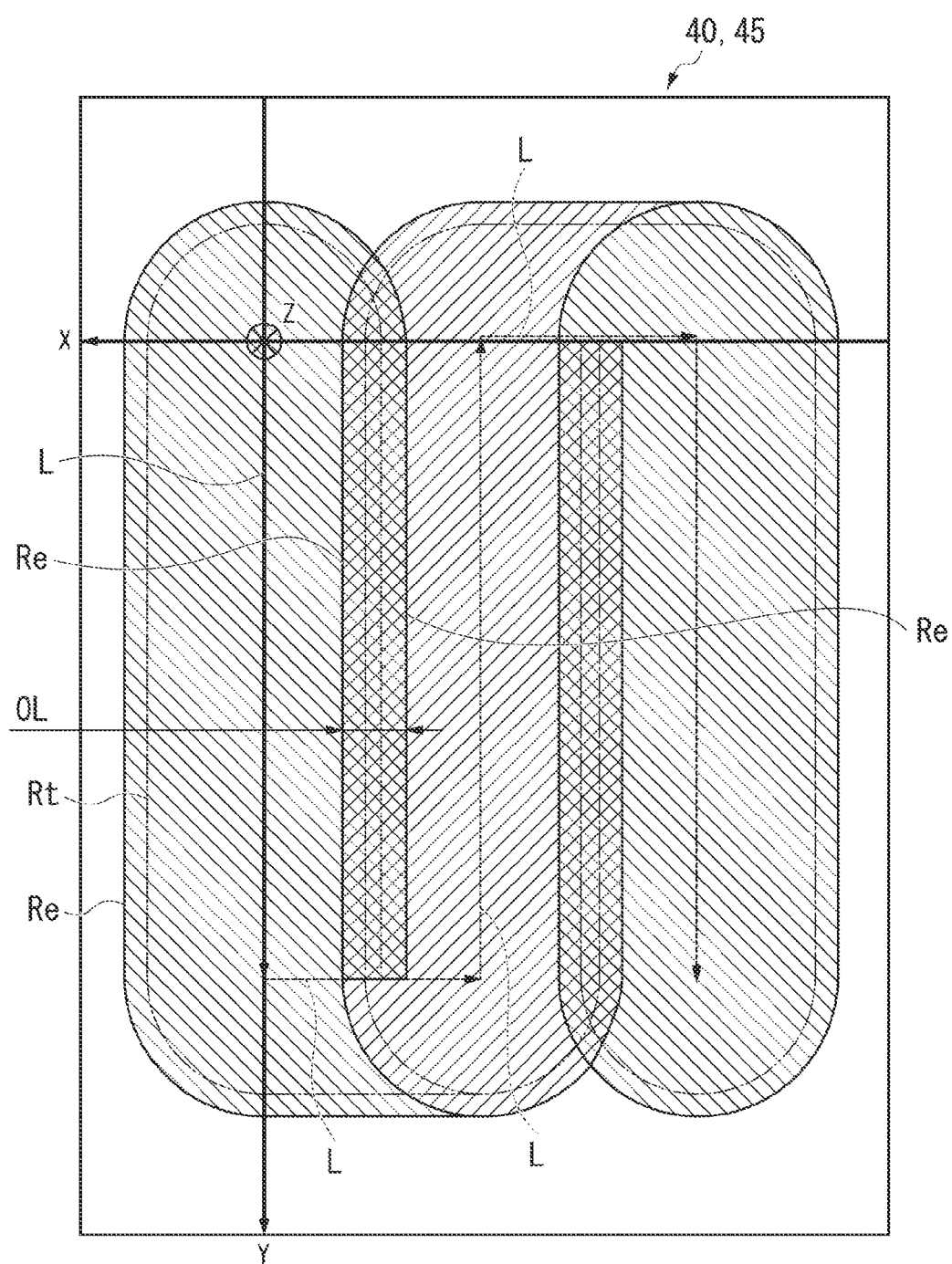
FIG. 9 is an illustrative diagram illustrating a relationship between the effective processing range and the target processing range when the nozzle is scanned in an embodiment according to the present invention.

In the process (S5) of setting the target processing range Rt, the evaluator operates the input device 11 of the WJP pre-evaluation device 10 to set the target processing range Rt in WJP along a locus L of the point of the intersection of the jet axis Ai of the moving nozzle 50 and the surface of peening target object model 45, on the surface of the peening target object model 45, as illustrated in FIGS. 8 and 9.

In the determination process (S12), it is determined by the determination unit 28 whether the effective processing range Re includes the entire target processing range Rt, as in the above-described case. In this determination process (S12a), although the effective processing range Re includes the entire target processing range Rt, it is also determined by the determination unit 28 whether an overlap amount OL of an adjacent effective processing range Re is equal to or smaller than a predetermined value.

For example, when the nozzle 50 is scanned in a (+) Y direction, shifted in the X direction, and then scanned in a (−) Y direction, it is determined by the determination unit 28 whether an overlap amount OL of the effective processing range Re when the nozzle 50 is scanned in the (+) Y direction and the effective processing range Re when the nozzle 50 is scanned in the (−) Y direction is equal to or smaller than the predetermined value, as illustrated in FIG. 9. If the overlap amount OL of the adjacent effective processing range Re is larger than the predetermined value, although the effective processing range Re includes the entire target processing range Rt, the effective processing range Re is not appropriate and the process returns to the condition setting process (S2).

Modified Example

In the above-described embodiment, the process (S4) of setting the target processing range is performed after the condition setting process (S3) and before the analysis process (S6). However, this process (S4) of setting the target processing range Rt may be executed in any step after the setting of the peening target object model 45 and the setting of the XYZ coordinate system and before the determination process (S12).

While the output process (S11) is performed in the above-described embodiment, this output process (S11) need not be performed. However, for convenience of the rater, it is preferable to execute this output process (S11).

Figure 10:
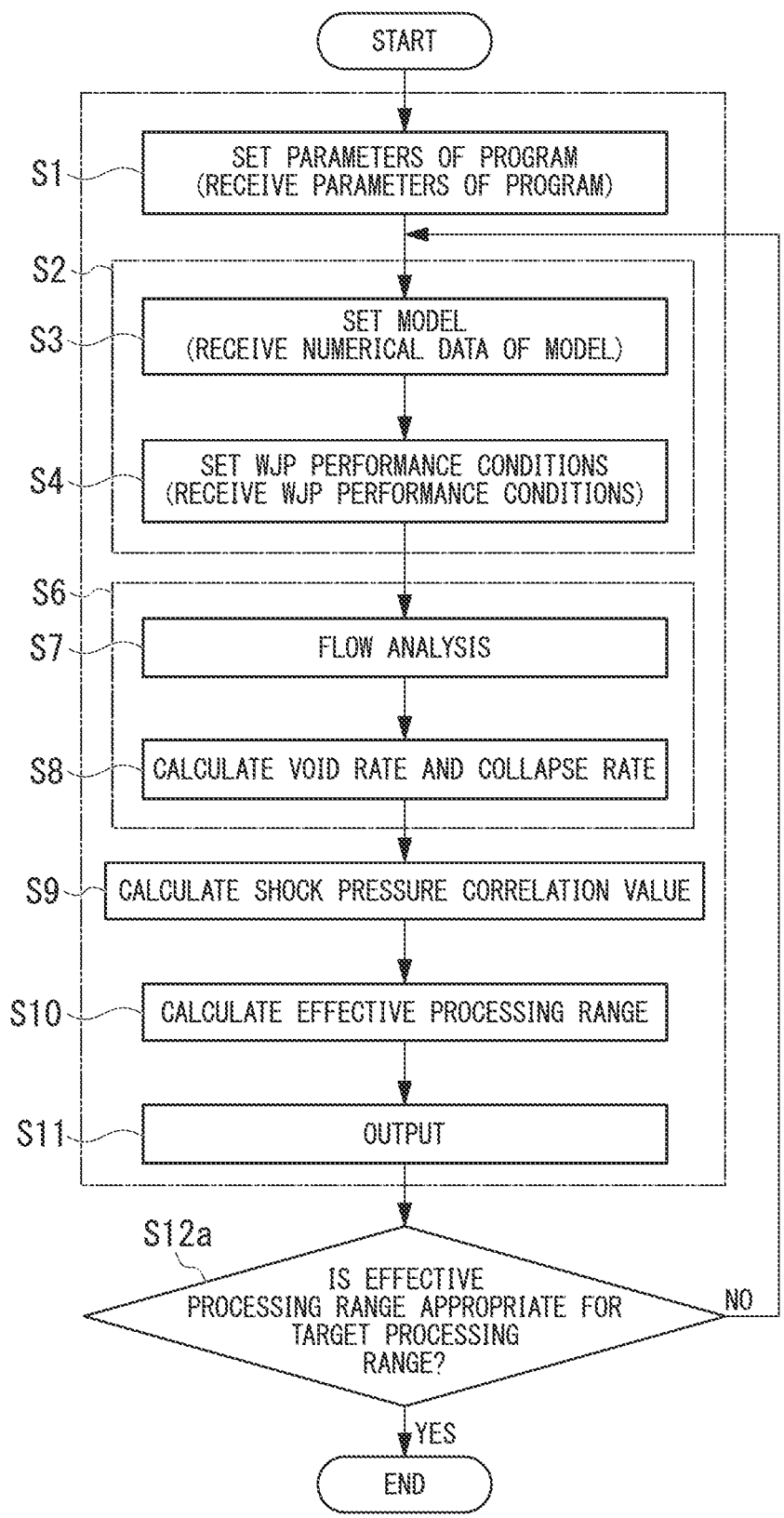
FIG. 10 is a flowchart illustrating a procedure of a WJP pre-evaluation method in a modified example of the embodiment according to the present invention.

In the above-described embodiment, the process (S5) of setting the target processing range is executed for the WJP pre-evaluation device 10. The WJP pre-evaluation device 10 executes the determination process (S12) for the effective processing range Re based on the target processing range Rt set in this process (S5). However, the evaluator himself/herself may execute the determination process (S12a) for the effective processing range Re instead of the process (S5) of setting the target processing range being executed, and the process may return to the condition setting process (S2) when the effective processing range Re is inappropriate, as illustrated in the flowchart of FIG. 10. In addition, in FIG. 10, a process surrounded by a two-dot chain line is a process that is executed in the WJP pre-evaluation device 10, and a process not surrounded by the two-dot chain line is a process that is performed by the evaluator himself/herself.

INDUSTRIAL APPLICABILITY

According to the method of pre-evaluating water jet peening, the recording medium having a program recorded thereon to execute this method, the device for executing this method, and the water jet peening method described above, it is possible to estimate the range in which the effective process is performed on the surface of the peening target object. Therefore, it is possible to quickly determine the peening conditions for WJP according to this estimated range without depending on a test. As a result, it is possible to increase efficiency of the WJP.

REFERENCE SIGNS LIST

10 WJP pre-evaluation device
11 input device
12 display unit (output device)
13 memory
20 CPU
21 parameter reception unit
22 condition reception unit
23 flow analysis unit
24 target range reception unit
25 void rate and collapse rate calculation unit
26 shock pressure correlation value calculation unit
27 range calculation unit
28 determination unit
29 output unit
30 auxiliary storage device
31 peening condition data
32 flow analysis data
33 processing range data
34 WJP pre-evaluation program
35 flow analysis module
36 processing range analysis module
40 peening target object
45 peening target object model
50 nozzle
55 nozzle model

What is claimed is:

1. A method of pre-evaluating water jet peening, comprising:
    a condition setting process of determining peening conditions for water jet peening on a peening target object;
    an analysis process of analyzing a jet when a liquid is jetted from a nozzle model to a peening target object model according to the peening conditions, and obtaining a void rate that is a volume rate of air bubbles contained in a unit volume of the liquid and a collapse rate that is a volume of the air bubbles collapsing in a unit time in the unit volume of the liquid, in a number of positions on a surface of the peening target object model;
    a shock pressure correlation value calculation process of obtaining a shock pressure correlation value that is a product of the void rate and the collapse rate in each position on the surface of the peening target object model; and
    a range calculation process of obtaining an effective processing range on the surface of the peening target object model indicating an effective water jet peening in which the shock pressure correlation value on the surface of the peening target object model is greater than a predetermined value, based on the shock pressure correlation value in each position on the surface of the peening target object model.

2. The method of pre-evaluating water jet peening according to claim 1, wherein the predetermined value is 0.

3. The method of pre-evaluating water jet peening according to claim 1, further comprising:
    a determination process of determining whether the effective processing range obtained in the range calculation process is an appropriate range in a relationship with a target processing range,
    wherein, when it is determined in the determination process that the effective processing range obtained in the range calculation process is not the appropriate range in the relationship with the target processing range, the peening conditions determined in the condition setting process are changed and then the shock pressure correlation value calculation process and the range calculation process are executed again.

4. The method of pre-evaluating water jet peening according to claim 2, further comprising:
    a determination process of determining whether the effective processing range obtained in the range calculation process is an appropriate range in a relationship with a target processing range,
    wherein, when it is determined in the determination process that the effective processing range obtained in the range calculation process is not the appropriate range in the relationship with the target processing range, the peening conditions determined in the condition setting process are changed and then the shock pressure correlation value calculation process and the range calculation process are executed again.

5. The method of pre-evaluating water jet peening according to claim 3,
    wherein the condition setting process includes a nozzle model setting process of identifying a shape of the nozzle model, and
    when it is determined in the determination process that the effective processing range obtained in the range calculation process is not the appropriate range in the relationship with the target processing range, the shape of the nozzle model identified in the nozzle model setting process is changed and then the shock pressure correlation value calculation process and the range calculation process are executed again.

6. The method of pre-evaluating water jet peening according to claim 4,
wherein the condition setting process includes a nozzle model setting process of identifying a shape of the nozzle model, and
when it is determined in the determination process that the effective processing range obtained in the range calculation process is not the appropriate range in the relationship with the target processing range, the shape of the nozzle model identified in the nozzle model setting process is changed and then the shock pressure correlation value calculation process and the range calculation process are executed again.

7. The method of pre-evaluating water jet peening according to claim 1, further comprising an output process of outputting the effective processing range obtained in the range calculation process.

8. A water jet peening method comprising:
executing the method of pre-evaluating water jet peening according to claim 3; and
executing water jet peening for the peening target object under the peening conditions determined in the condition setting process when it is determined in the determination process that the effective processing range obtained in the range calculation process is the appropriate range in the relationship with the target processing range.

9. A water jet peening method comprising:
executing the method of pre-evaluating water jet peening according to claim 4; and
executing water jet peening for the peening target object under the peening conditions determined in the condition setting process when it is determined in the determination process that the effective processing range obtained in the range calculation process is the appropriate range in the relationship with the target processing range.

* * * * *